United States Patent Office 3,408,858
Patented Nov. 5, 1968

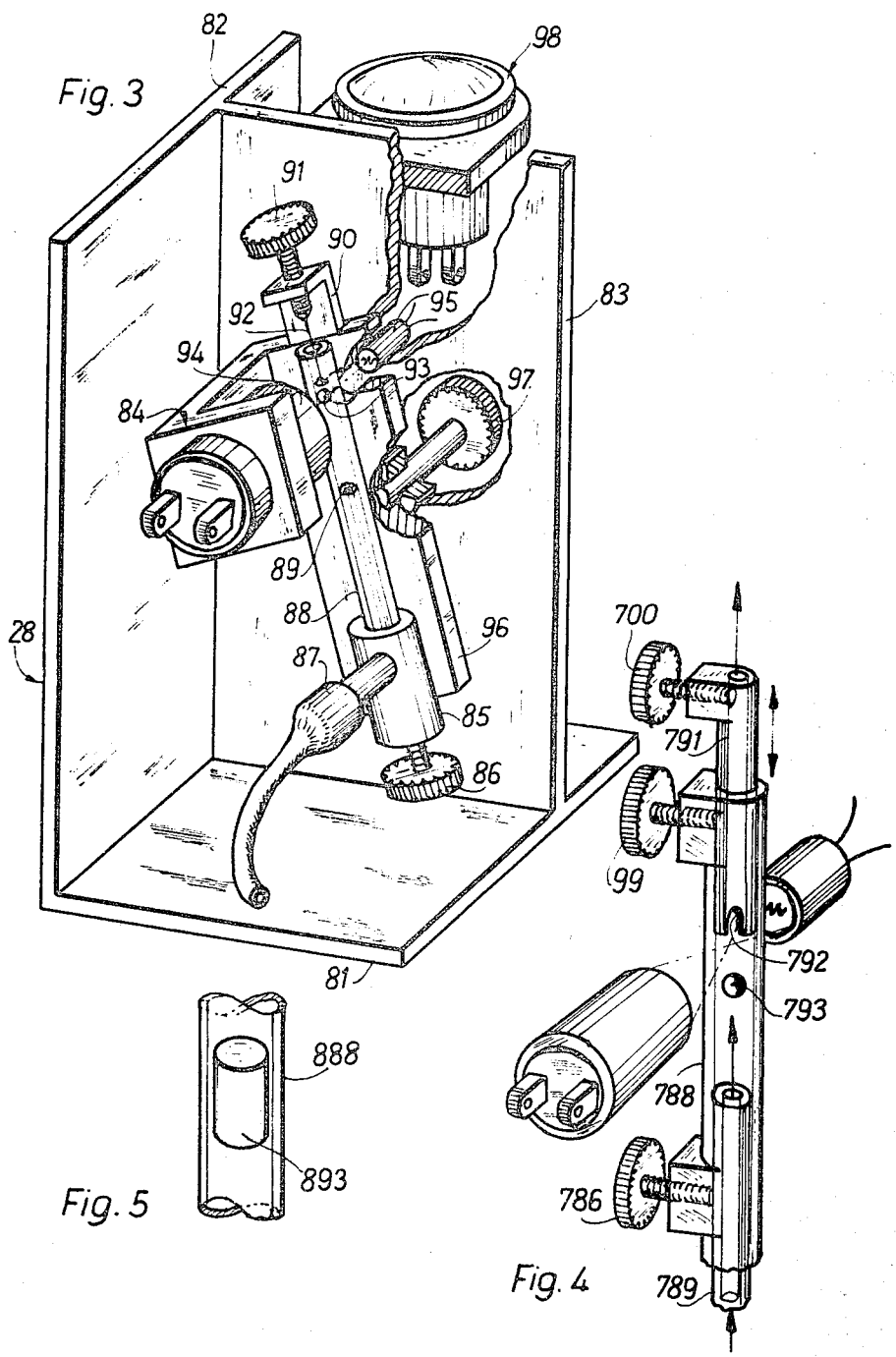

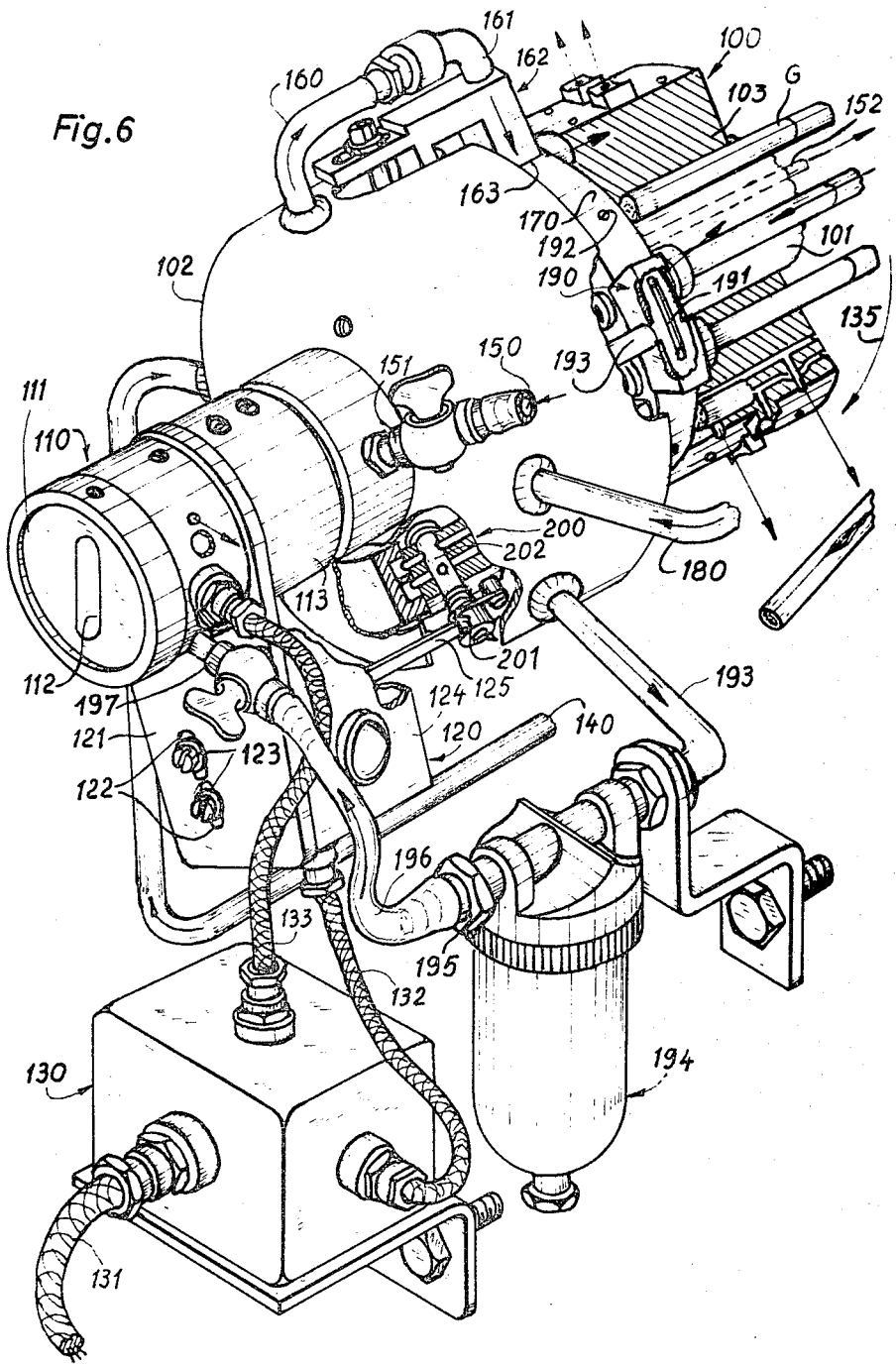

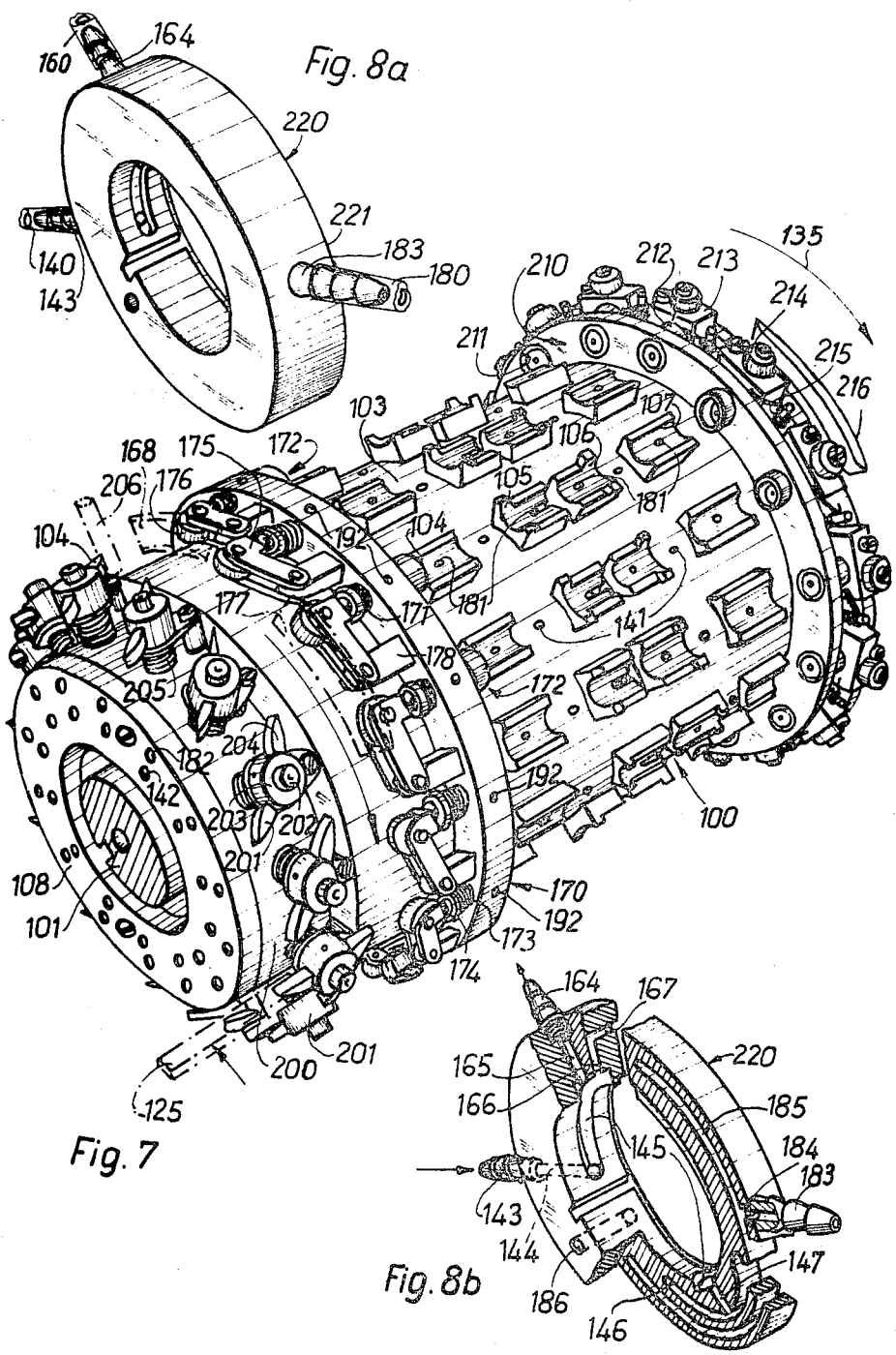

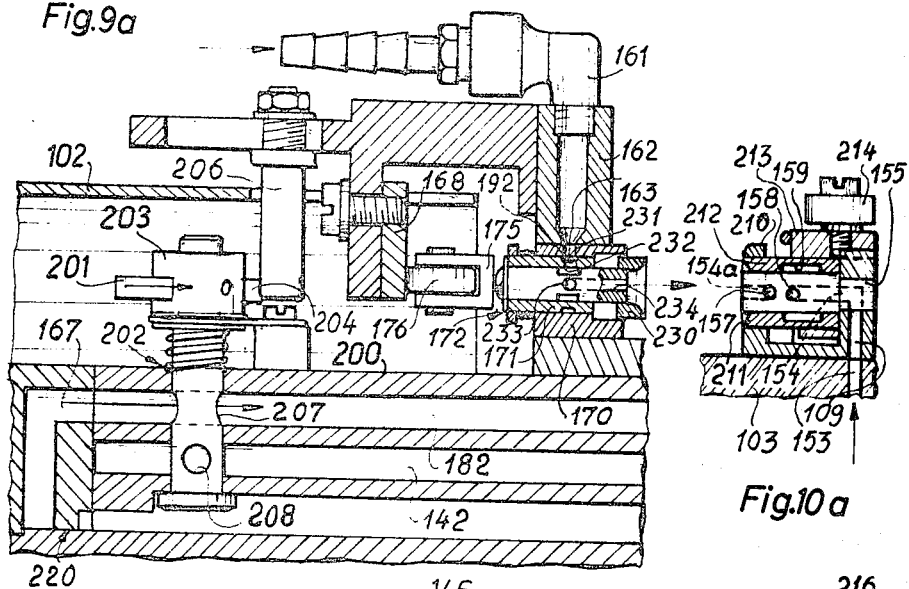

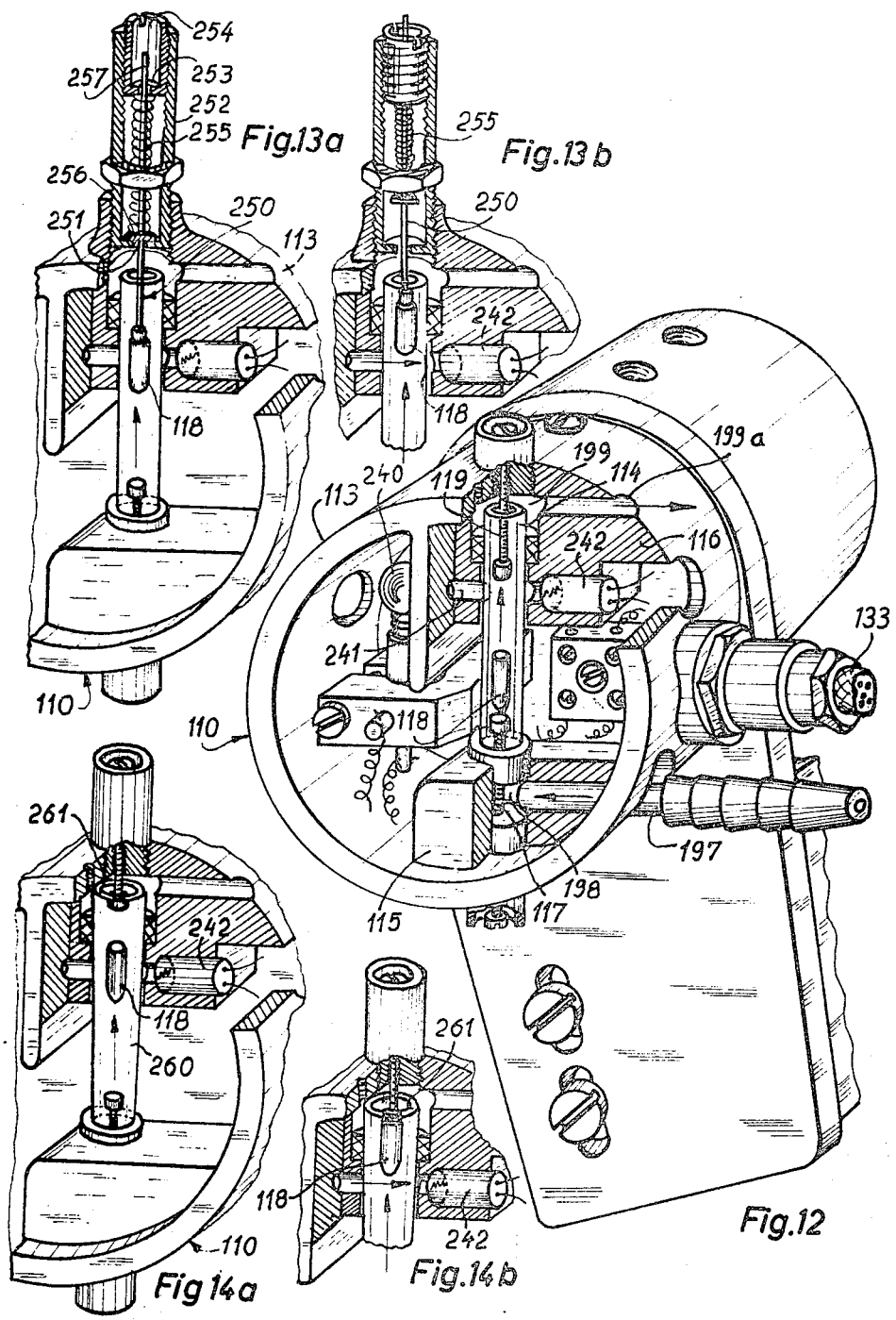

3,408,858
METHOD AND APPARATUS FOR TESTING
CIGARETTES AND THE LIKE
Heinz Kaeding, Hamburg-Bergedorf, and Konrad
Schmalz, Wentorf, near Hamburg, Germany, assignors to Hauni-Werke Korber & Co. K.G., Hamburg-Bergedorf, Germany, a German company
Continuation of application Ser. No. 538,098, Mar. 28, 1966, which is a continuation of application Ser. No. 208,189, July 5, 1962. This application Dec. 20, 1967, Ser. No. 692,247
Claims priority, application Great Britain, July 7, 1961, 24,630/61; Nov. 3, 1961, 39,430/61; Nov. 8, 1961, 39,976/61; July 5, 1962, 25,779/62
52 Claims. (Cl. 73—45.2)

ABSTRACT OF THE DISCLOSURE

Cigarettes are tested while travelling sideways with a rotary drum past a testing station where the cigarettes receive currents of air. The currents are collected to form successive increments of an air stream and the characteristics of such increments are compared with a predetermined norm which is indicative of satisfactory cigarettes. Defective cigarettes are segregated from satisfactory cigarettes at a point ahead of that point where the satisfactory cigarettes leave the drum.

---

This application is a streamlined continuation of our application Ser. No. 538,098 filed Mar. 28, 1966, which is a continuation of application Ser. No. 208,189, filed July 5, 1962.

This invention relates generally to a method and apparatus for testing hollow, generally cylindrical articles usually containing a filling to determine whether the hollow articles are undamaged and, where the latter contain a filling, whether the filling is sufficiently compact. More particularly, the invention is directed to improvements in the testing of rod-shaped tobacco products and components thereof, including wrapped rods of tobacco, cigarettes, filter cigarettes, filter tubes, sleeves or mouthpieces, with or without filter plugs therein, and cigars, cigarillos and the like, with or without mouthpieces or filters. Wherever the term "cigarette" is employed in the following description and claims, that term is intended to include any of the above identified tobacco products or components thereof.

When manufacturing cigarettes and the like, damages or defects may occur in the paper wrapper of the cigarettes or in the connection of the cigarette to the paper sleeve which extends aroun dthe filter and joins the latter to the cigarette, which damages or defects produce leaks in the paper wrapper or the connecting sleeve, or at the joint of the latter to the cigarette and thereby adversely affect the smoking properties of the cigarette. Since it is desirable to eliminate all such defective cigarettes from the manufacturing process, devices have been proposed, for example, as in United States Letters Patent No. 2,-951,364, issued Sept. 6, 1960, to Joseph H. Sherrill, for testing each cigarette for leaks in its outer wall and for withdrawing or rejecting those cigarettes in which leaks are found to exist.

In the arrangement proposed in the above identified patent, carriers, each adapted to support a cigarette or a double filtered cigarette unit, are linked together to form a conveyor belt. The opposite ends of each carrier further support a test device and an air supply coupling mechanism. As the conveyor moves the successive cigarette units past a test station, the coupling mechanism at one end of each carrier is coupled to a supply of compressed air so that, if there is no leak in the cigarette unit, air is conveyed through the cigarette unit to the testing device on the associated carrier having a movable member which is displaced from a leak indicating position to a no-leak indicating position. The movable members of the test devices supported by the carriers successively actuate a checking device located alongside the path of travel of the conveyor, and the checking device, in turn, actuates a memory device which indicates whether or not the cigarette on each particular carrier has a leak. Thereafter, as the respective carriers pass an ejector station, an ejector mechanism is controlled in accordance with the respective indications of the memory device to eject defective cigarettes from the related carriers.

One important disadvantage of the above described existing arrangement for testing cigarettes and the like is the provision of an individual testing device on each carrier for a cigarette or cigarette unit, whereby the arrangement is substantially complicated and further does not provide for testing of the cigarettes with respect to a uniform standard by reason of possible variations of the characteristics of the several testing devices. Further, since the movable member of each testing device indicates the presence of a satisfactory cigarette or unit on the respective carrier by moving from its leak indicating position to its no-leak indicating position upon passing the testing station, it is obvious that the inertia of the movable member of the testing device must be overcome in order to provide a no-leak indication, thereby restricting the speed of operation and the accuracy of the testing device.

It has also been found that, with the above described existing arrangement, the compressed air transmitted through the cigarettes into the individual testing devices for actuating the latter frequently dislodge tobacco particles from the cigarettes, which particles clog the opening into the test devices and thereby prevent the accurate subsequent operation of the latter. Finally, with the existing arrangement, it is possible only to test for the occurrence of leaks in the wrapper or covering of the cigarette or unit, so that cigarettes or other tobacco products which are defective by reason of the occurrence of holes or inadequate packing of the filler cannot be detected and withdrawn from the manufacturing process.

Accordingly, it is an object of this invention to provide a method and apparatus for the testing of cigarettes and other tobacco products, and components thereof, which avoid the above mentioned disadvantages of the devices and arrangements previously proposed for that purpose. More specifically, it is an object of this invention to provide a cigarette testing apparatus capable of accurately detecting and rejecting defective cigarettes or other tobacco products and components thereof while operating at a high rate of speed.

In accordance with an aspect of the invention, an apparatus for testing cigarettes and the like comprises conveying means, which may be in the form of a drum, having carriers spaced apart therealong for receiving the individual cigarettes, with each carrier having a pair of coupling and valve members disposed adjacent its opposite ends for engagement with the adjacent ends of a cigarette supported in the related carrier, the conveying means moving the successive carriers past a testing station at which the coupling and valve member at one end of the carrier establishes communication between a supply of compressed air while the coupling and valve member at the opposite end of the carrier establishes communication between the adjacent end of the cigarette and a single stationary testing device having a movable member subjected to a flow of air from the cigarette, the single stationary device being arranged so as to always receive a flow of air from at least one of the cigarettes on a carrier passing the testing station, whereby the movable member of the testing device is normally continuously maintained at a position characteristic of satisfactory cigarettes so long as the successive cigarette being tested are without defects, whereas any defect appearing in a tested cigarette, either in the form of a leak in the wrapper thereof or inadequate compacting of its filling, alters the rate of flow of air through such cigarette acting on the movable member of the testing device and permits displacement of such movable member to defect indicating positions.

Since a single testing device is employed for the testing of the successive cigarettes in accordance with this invention, the same test characteristics or parameters are applied to all of the tested cigarettes. Further, since the movable member of the testing device is always subjected to the action of a stream of air passing through at least one of the cigarettes, and thereby is maintained in its position indicating that the tested cigarettes are without defects, each test does not involve overcoming of the inertia of the movable member of the test device and, furthermore, a relatively low pressure of air may be employed for conducting the tests so that compression of the air is avoided with a corresponding increase in the accuracy of the test results.

A further object of the invention is to provide cigarette testing apparatus of the described character in which the cigarettes are normally held to the carriers of the conveying means by suction acting at ports opening in the carriers and, upon the sensing of a defective cigarette, the latter is ejected from the related carrier by jets of compressed air issuing from ports opening adjacent the carriers and the suction which normally holds the cigarette in the carrier is simultaneously interrupted.

Still another object is to provide a cigarette testing apparatus of the described character in which, following the discharge of the tested cigarettes from the carriers of the conveying means, and prior to the return of such carriers to the station at which other cigarettes are received for testing, the coupling and valve members at the ends of the carriers which are successively communicated with the testing device have compressed air passed therethrough in the direction opposed to the passage of air during testing so as to clear out any tobacco particles that may have previously lodged therein.

The above, and other objects, features and advantages of this invention, will be apparent in the following detailed description of illustrative embodiments thereof which is to be read in connection with the accompanying drawings, forming a part hereof, and wherein:

FIG. 3 is a perspective view of a testing device forming a part of the apparatus illustrated on FIG. 2;

FIG. 4 is a schematic perspective view illustrating a modification of the testing device of FIG. 3;

FIG. 5 is a fragmentary detail view illustrating another modification of the testing device of FIG. 3;

FIG. 6 is a perspective view, partly broken away and in section, of an apparatus for testing cigarettes in accordance with another embodiment of the invention;

FIG. 7 is a perspective view of a conveying drum forming a part of the apparatus illustrated on FIG. 6;

FIG. 8a is a perspective view of an air control ring also included in the apparatus of FIG. 6;

FIG. 8b is a perspective view, partly broken away and in section, of the air control ring of FIG. 8a;

FIG. 9a is a fragmentary, enlarged axial sectional view of a portion of the apparatus illustrated on FIG. 6, and showing the mechanism by which compressed air is made to flow through coupling and valve members of such apparatus for ensuring the clean condition thereof prior to the testing of cigarettes;

FIG. 9b is a fragmentary axial sectional view of a portion of the apparatus of FIG. 6, and showing the mechanism by which defective cigarettes are ejected from the carriers on the conveyor drum;

FIGS. 10a and 10b are axial sectional views of one of the coupling and valve members through which an end of each cigarette or the like is communicated with a source of compressed air during the testing thereof, and showing such coupling and valve member in its closed and opened positions, respectively;

FIG. 11 is a side elevational view, partly broken away and in section, of one of the carriers by which the successive cigarettes to be tested are held on the conveyor drum of FIG. 7;

FIG. 12 is a perspective view, partly broken away and in section, showing the testing device included in the apparatus of FIG. 6, but on an enlarged scale;

FIGS. 13a and 13b are detail perspective views, partly broken away and in section, illustrating a modification of the testing device that may be incorporated in the apparatus of FIG. 6, with such testing device being shown in two different operative positions;

FIGS. 14a and 14b are views similar to those of FIGS. 13a and 13b, but showing a further modification of the testing device;

Figure 1:
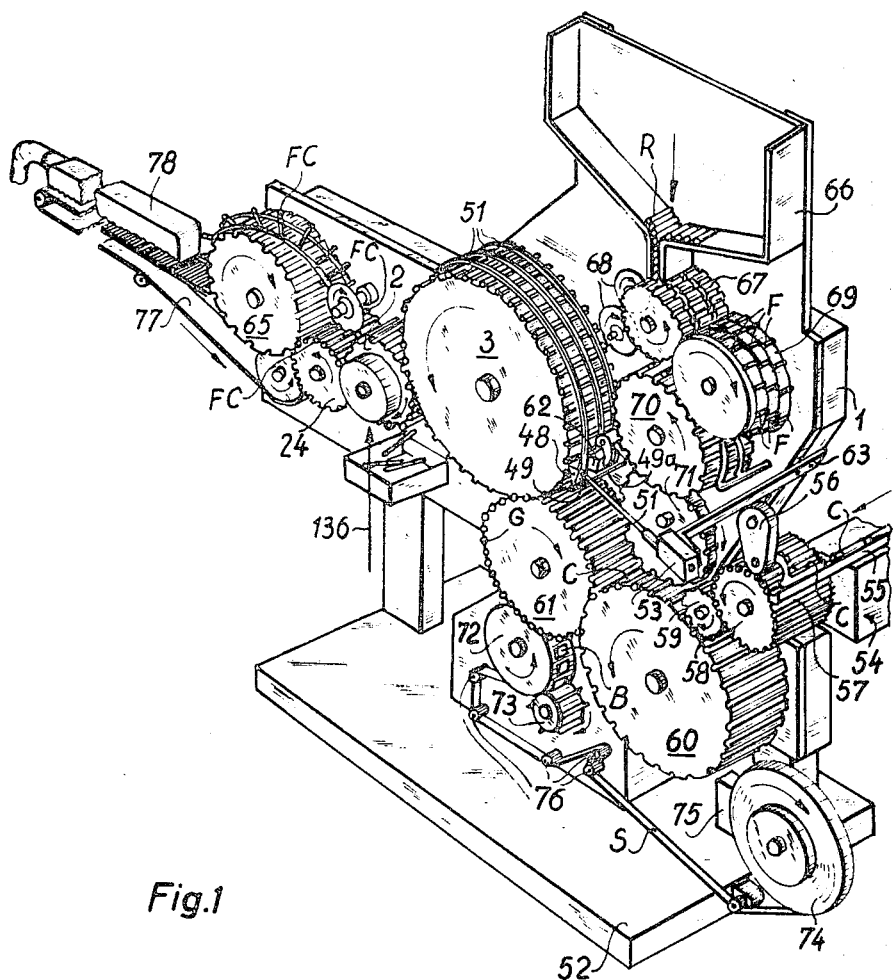
FIG. 1 is a schematic perspective view of a filter cigarette making machine provided with an apparatus for testing the cigarettes in accordance with one embodiment of this invention.

Referring to the drawing in detail, and initially to FIG. 1 thereof, it will be seen that an apparatus for testing cigarettes or other rod-shaped tobacco products or components thereof in accordance with the present invention may be associated with a filter cigarette making or assembling machine having a base plate 52 with a side wall 1 extending upwardly therefrom and forming part of the machine frame. In order to supply the cigarettes, a cigarette making machine 54 is arranged with its cigarette take-off conveyor belt 55 extending directly to the filter cigarette machine, and a crank mounted feeder slide 56 delivers two cigarettes C at a time to each of the holders 57 of a cigarette magazine or storage drum 58. The cigarettes are transferred from the cigarette magazine drum 58 by way of an intemediate drum 59 to a group or unit assembly drum 60 on which a double filter plug is inserted between each pair of cigarettes. The double filter plugs are received by the assembly drum 60 from a filter cutting and rearranging device disposed thereabove. This filter cutting and rearranging device generally includes a magazine 66 containing filter rods R which are delivered successively to a filter cutting drum 67 having rotary cutters 68 associated therewith so that each filter rod R is cut into three double filter plugs F. The three filter plugs F thus cut from each filter rod are transferred to a rearranging unit 69 consisting of three filter realigning disks which cooperate with a filter plug drum 70 on which the filter plugs are brought into the same plane of rotation. The filter plugs which are brought into alignment in the same plane of rotation are transferred to the assembly drum 60 by way of a grooved wheel 71 which is axially centered with respect to the latter.

The groups asembled on drum 60 and each including a pair of cigarettes C with a double filter plug F therebetween, are transferred to a group assembly closing drum 61 having guide devices at its opposite sides by which the cigarettes and filter plugs are moved axially together.

The device for supplying the sheets of gummed paper or other wrapping material from which the sleeves for connecting the cigarettes and filter plugs are formed is mounted below the assembly closing drum 61 and generally includes a holder 75 for a reel 74 from which a continuous strip S of the gummed paper is unwound. The strip S passes around reversing rollers 76 before passing between a cutter drum 73 and a backup drum 72 which cooperate to cut the strip S into sections or sheets B carried on the periphery of the drum 72 and transferred from the latter to the assembly closing drum 61 prior to the reception by the latter of the filter and cigarette groups from the assembly drum 60.

The filter and cigarette groups with the sheets for forming the connecting sleeves are successively transferred from drum 61 to a rolling drum 3 having guides 51 extending therearound and cooperating with a counter member 62 to rule the sheets of gummed paper or wrapping material into sleeves connecting each double filter plug F to the adjacent ends of the related pair of cigarettes C thereby forming a double filter cigarette unit. As disclosed more fully in the copending application for United States Letters Patent, identified as Serial No. 208,030 filed July 6, 1962, an incising or notching device may be mounted immediately below the counter member 62 and includes blades 48 in holders 49 which are rockably mounted and connected by a shaft 49a so that the blades 48 will simultaneously notch or cut into the cigarettes of each unit passing thereby when the blades 48 are moved towards the surface of drum 3 by a control rod 51 extending between one of the holders 49 and the armature of a solenoid 53 carried by a bracket 63. The solenoid 53 may be energized only during initial operation of the filter cigarette making machine so as to indicate those filter cigarette units which are produced during such initial operation and therefore are defective by reason of the drying out of the adhesive on the gummed sheets forming the connecting sleeves thereof.

The filter cigarette units are successively transferred fom the rolling drum 3 to a testing apparatus embodying the present invention and generally identified by the reference numeral 2. Such testing apparatus is hereinafter described in detail and generally operates to discard or eject defective filter cigarette units into an underlying receptacle. The remaining or satisfactory filter cigarette units are transferred from the testing apparatus 2 to a cutting drum 24 on which each filter cigarette unit is cut at its center to form two filter cigarettes FC. Since the filter cigarettes cut from each unit extend in opposite directions, and are arranged side by side, the filter cigarettes FC are transferred from the cutting drum 6 to a reversing drum 65 on which the filter cigarettes FC are arranged in a row, that is, aligned circumferentially with the filtered ends thereof all extending in the same direction prior to being deposited on a single row take-off conveyor belt 77 running below the drum 65. A suction device 78 is disposed above the conveyor belt 77 for removing layers or rows of cigarettes therefrom and for transferring such layers of cigarettes into cigarette storage trays or other suitable containers.

Figure 2:
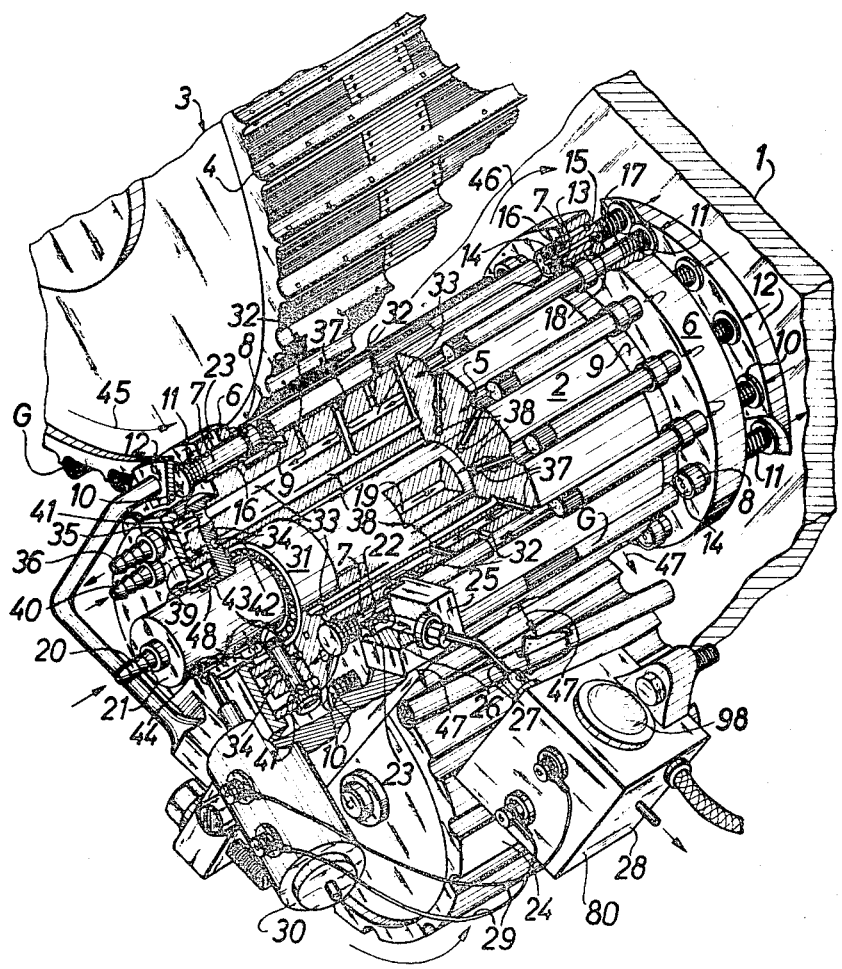
FIG. 2 is an enlarged, detail perspective view of the cigarette testing apparatus of FIG. 1, shown partly broken away and in section, and as viewed from below.

The present invention particularly relates to the testing apparatus 2 which, in the embodiment specifically illustrated on FIG. 2 is in the form of a test drum rotatably mounted by bearings 31 on a fixed axle 21 which is suitably supported, at one end, by the wall 1 of the machine frame. The test drum 2 is formed, adjacent its opposite ends, with outwardly directed radial flanges 6 and with annular or circumferential grooves 9 extending inwardly from the inner radial surfaces of the flanges 6. Further, the surface of test drum 2 between grooves 9 is formed with a circumferential series of equally spaced apart axially extending grooves 5 each adapted to receive a filter cigarette unit G from a groove or holder 4 of the rolling drum 3 at the line of tangency of test drum 2 with rolling drum 3. As is apparent in FIG. 2, each groove 5 of test drum 2 is longitudinally dimensioned so that the ends of the filter cigarette unit G received therein will project axially from the groove 5 into the adjacent annular grooves 9.

The flanges 6 are each formed with a circularly arranged series of bores extending axially therethrough and being aligned axially with the grooves 5, and slide valves 7 are axially slidable in such bores. The end of each slide valve 7 directed toward the adjacent end of the related groove 5 carries a coupling member 8 which is freely movable within the adjacent annular groove 9, while a head 10 is formed on the opposite end of the slide valve. A helical compression spring 11 is provided on each slide valve 7 between the related head 10 and the flange 6 for yieldably urging the slide valve and the associated coupling member 8 axially away from the adjacent end of the groove 5. Thus, as shown on FIG. 2, when a filter cigarette unit G is transferred from a groove 4 of rolling drum 3 to a groove 5 of test drum 2, the slide valves 7 at the opposite ends of that groove 5 are axially disposed so that the distance between the related coupling members 8 is substantially greater than the length of the unit G. As each groove 5 of drum 2 moves away from the line of tangency of the latter with drum 3 by reason of the rotation of the drum 2 in the direction indicated by the arrow 46, the heads 10 of the valves 7 at the opposite ends of the groove 5 come into engagement with cams 12 which are respectively mounted on the frame wall 1 and on a bracket which is fixedly mounted adjacent the free end of axle 21, whereby the valves 7 are shifted axially toward the adjacent ends of groove 5 so as to engage the coupling members 8 with the ends of the filter cigarette unit G in the groove 5. Each coupling member 8 contains a flexible annular packing 14 of a very soft and yielding material which is adapted to be pressed against the adjacent end of the filter cigarette unit for sealing engagement therewith, and each slide valve 7 is formed with an axial bore 13 forming an extension of the central opening of the annular packing 14. Further, each slide valve 7 is held against rotation in the related bore of flange 6 by a pin 15 projecting radially from the slide valve and movable in a guide groove 16 extending axially in the surface of the related bore of flange 6.

The slide valves 7 carried by the flange 6 adjacent the frame wall 1 are each provided with a radial bore 17 extending from the axial bore 13 in the direction toward the axis of rotation of test drum 2 and being disposed along the related valve 7 so that, when the latter is axially displaced by the related cam 12, bore 17 comes into alignment with the outer end of a compressed air duct 18 extending radially outward in the related flange 6. The inner end of each radial duct 18 is supplied with compressed air from a passage 19 extending axially within axle 21 from a nipple 20 at the outer or free end thereof which may be connected, as by a flexible hose or the like, to a source of compressed air (not shown).

Each of the slide valves 7 mounted in the flange 6 remote from the frame wall 1 is formed with a radial bore 22 extending from the axial bore 13 of the valve in the direction away from the axis of rotation of test drum 2, and the radial bore 22 of each valve is disposed along the latter so that, when each valve 7 in the flange 6 remote from frame wall 1 is displaced axially by the related cam 12, the bore 22 thereof comes into alignment with a radial exhaust port 23 provided in the related flange 6 for each of the valves 7 carried by the latter and opening at the outer peripheral surface of that flange.

A test block 25 is in sealing engagement with the outer peripheral surface of the flange 6 remote from frame wall 1 and is disposed at a fixed location in advance of the line of tangency of the test drum 2 with the cutting drum 24 to which the satisfactory filter cigarette units G are transferred for cutting thereon into filter cigarettes. The test block 25 has a duct 26 opening at the peripheral surface of the adjacent flange 6 and located for registration with the exhaust ports 23 moving successively past the test block. A conduit or pipe 27 extends from the duct 26 of block 25 to a testing or signalling device which is generally identified by the reference numeral 28. The testing or signalling device 28, which is hereinafter described in detail, is intended to provide an electrical impulse or signal when a defective filter cigarette unit G is disposed in the groove 5 of the test drum then passing the test station which is defined by the location of test block 25. Such electrical impulse or signal is transmitted through wires 29 to a solenoid or electromagnet 30 for energizing the latter so that, as hereinafter described in detail, the defective filter cigarette unit will be ejected from the related groove 5 before the latter reaches the line of tangency between the drums 2 and 24 at which the filter cigarette unit would be normally transferred to the cutting drum 24.

In order to normally hold the filter cigarette units G in the grooves 5 as the latter travel along the lower half of testing drum 2, the latter is formed with radial suction ports 32 opening at the grooves 5 and communicating with axial suction ducts 33 which, at the end of the testing drum remote from frame wall 1, open into an annular suction chamber which is placed in communication with a source of vacuum (not shown) through a suction connection 36 carried by a fixed cap in sealing engagement with the end of test drum 2. Further, the test drum is provided with compressed air ports 37 opening into each of the grooves 5 and communicating with axial compressed air ducts 38 which also open, at the end of the test drum remote from frame wall 1, into an annular compressed air chamber 39 which is in communication with a source of compressed air (not shown) through a compressed air connection 40 provided on the fixed cap. The suction and compressed air ducts 33 and 38 associated with each of the axial grooves 5 are alternatively communicated with the annular suction and compressed air chambers 35 and 39, respectively, through bores 41 and 42, respectively, which extend diametrically, at right angles to each other, through an associated rotary valve 34. Thus, when the valve 34 is turned to the position where bore 41 is aligned with the related duct 33, the suction duct 38 is blocked by the valve 34 and suction is applied to the suction ports 32 of the related groove 5 for securely holding a filter cigarette unit G in the latter. However, when valve 34 is turned through ninety degrees from the above described position, the suction duct 33 is closed by the valve, while the bore 42 of the latter is aligned with the compressed air duct 38 so that jets of compressed air issue radially outward through the ports 37 and thereby eject the filter cigarette unit from the related groove 5.

Each valve 34 has a control lever 43 extending from the inner end thereof, that is, from the end adjacent axle or spindle 21, and a return torsional spring 48 acts on each valve 34 to urge the latter to the position in which the related control lever 43 extends parallel to the axis of axle 21, whereby the valve is disposed with its bore 41 in alignment with the related suction duct 33. Thus, the valve 34 is normally disposed for applying suction to the ports 32 of the related groove 5 thereby to retain a filter cigarette unit in the latter.

In order to cause ejection of defective filter cigarette units, the previously mentioned solenoid 30 is connected to an actuating lever 44 which is normally retained in a position out of the path of travel of the control levers 43 of the valves 34. However, upon energization of the solenoid 30, the actuating lever 44 is angularly displayed from its normal or inoperative position to the operative position shown on FIG. 2 where the lever 44 projects into the path of travel of the control lever 43 of the valve member 34 associated with the groove 5 then passing the ejecting station. The engagement of actuating lever 44 with a control lever 43 during turning of the test drum 2 causes turning of the related valve 34 to the position where its bore 42 is in alignment with the compressed air duct 38 whereby communication of the ports 32 with the source of vacuum is interrupted and jets of compressed air issue from the ports 37 for ejecting the defective filter cigarette unit G from the related groove 5.

Referring now to FIG. 3, it will be seen that the testing or signalling device 28, which along with the test block 25 and the solenoid 30 may be fixedly mounted on suitable brackets or holders adjacent the test drum 2, includes a cover 80 (removed in FIG. 3) having a frame therein consisting of a base 81, a side wall 82 and a supporting plate or partition 83 extending between the base and side wall. A mounting bracket 84 is mounted on partition 83 for rockable adjustment about a horizontal axis and is adapted to be held in its adjusted position by a lock screw 97. The mounting bracket 84 includes a depending leg 96 which, at its lower end, carries a sleeve 85 having a bore therein to define an aperture which is adjustable by a valve screw 86. Such adjustable aperture is in communication with a hose coupling 87 from which a flexible hose extends to the pipe or conduit 27 (FIG. 2) in communication with the duct 26 of test block 25. A glass tube 88 extends upwardly from sleeve 85 and a nozzle 89 extends into the glass tube 88 from the adjustable orifice of sleeve 85. An angle member 90 extends upwardly from bracket 84 and has a leg overlying the upper open end of glass tube 88, and an adjustable screw is threaded through such leg of angle member 90 in axial alignment with glass tube 88. A pin 92 extends axially from screw 91 into the upper end portion of glass tube 88 with radial clearance therebetween and a sphere or ball 93 is free to travel longitudinally within glass tube 88 between nozzle 89 and the lower end of pin 92 which acts as an adjustable stop. A light source 94 is also carried by mounting bracket 84 and directs a beam of light diametrically through the upper portion of glass tube 88 at a location immediately under the lower end of stop pin 92, and a photoelectric cell 95 is mounted in alignment with light source 94, but at the diametrically opposed side of glass tube 88.

It will be apparent that, when the jet of air issuing upwardly from the nozzle 89 has a sufficiently high velocity such jet of air will drive the ball 93 upwardly against the stop pin 92, in which position the ball 93 intercepts the beam of light from source 94 so that photoelectric cell 95 remains deenergized. However, if the flow of air from nozzle 89 is diminished, gravity acting on ball 93 moves the latter downwardly so that the beam of light from source 94 is no longer obstructed and effects energization of photoelectric cell 95 whereby an electrical signal is emitted from cell 95 for energizing both the solenoid 30 and a signal light 98 which is exposed to view at the cover 80 of testing or signalling device 28.

The testing apparatus 2 described above with reference to FIGS. 2 and 3 operates as follows:

As successive filter cigarette units G are transferred from rolling drum 3 to the grooves 5 of test drum 2, the valves 34 associated with such grooves 5 are in their normal positions so that suction is effective at the bores 32 to hold the filter cigarette units in the grooves 5. As the grooves 5 come into the regions of the fixed cams 12, the latter act on the heads 10 of the related slide valves 7 so that initially the coupling members 8 of the valves are moved into sealing engagements with the opposite ends of the related filter cigaret units, where upon, the bores 17 and 22 of the valves 7 are aligned with the radial ducts 18 and exhaust ports 23, respectively, so that compressed air is made to flow axially through each filter cigarette unit G in the direction away from the frame wall 1. When each filter cigarette unit G reaches the testing station defined by the location of the test block 25, the related exhaust port 23 registers with the duct 26 of test block 25 so that the flow of compressed air through the filter cigarette unit G being tested is led through pipe 27 and the associated flexible tube secured to connection 87 (FIG. 3)

and produces a flow of air upwardly through glass tube 88 from nozzle 89. If the filter cigarette unit undergoing the test is satisfactory, that is, if the wrappers of the cigarettes and the connecting sleeve securing the latter to the filter plug are without holes or tears and adhesively secured to each other in an air-tight manner, then the flow of air in glass tube 88 is sufficiently strong to maintain ball 93 against stop pin 92, that is, in the position obstructing the light beam from source 94 so that an electrical signal or pulse is not emitted by photoelectric cell 96 and the actuating lever 44 controlled by solenoid 30 remains in its inoperative position. So long as actuating lever 44 remains in its inoperative position, the tested filter cigarette units are retained in the related grooves 5 by suction acting at ports 32 until such filter cigarette units are transferred to the cutting drum 24.

However, if a filter cigaretter unit G has an inadequately secured connecting sleeve between its cigarettes or tears or holes in the cigarette wrappers thereof, then compressed air can leak from the filter cigarette unit during the testing thereof, that is, when the related groove 5 is at the location of the test block 25, whereby the flow of air through duct 26, pipe 27, connection 87 and nozzle 89 is diminished and the ball 93 falls within tube 88 to permit the light beam from source 94 to impinge on photoelectric cell 95 and thereby produce an electrical signal or impulse which causes energization of solenoid 30 and of signal lamp 98. The energization of solenoid 30 moves actuating lever 44 to its operative position so that the control lever 43 of the rotary valve 34 associated with the groove 5 containing the defective filter cigarette unit is thereby turned to interrupt the communication of ports 32 with the source of vacuum and to establish communication of the ports 37 with the source of compressed air. Thus, as the defective filter cigarette unit G passes the ejection station, jets of compressed air 47 (FIG. 2) issue from the ports 37 and eject the defective unit from the related groove. After each groove 5 has passed the ejection station, the lever 43 of its associated rotary valve 34 is removed from the range of the actuating lever 44 so that the valve 34 is thereby returned to its normal position by the associated spring 48.

In order to increase the sensitivity and accuracy of the testing or signalling device 28, the test block 25 preferably has an elongated groove in the surface thereof engageable with the adjacent flange 6 and having an extent substantially equal to the distance between the successive exhaust ports 23 so that the duct 26, which opens into such elongated groove, will always be in communication with one of the exhaust ports 23. Thus, so long as satisfactory filter cigarette units G are being succesively tested, the continuous flow of air from nozzle 89 of device 28 will be sufficient to maintain the ball 93 in its raised position against stop pin 92. This ensures that the testing of the successive cigarettes can be accomplished without having to overcome the inertia of the ball 93. Further, a relatively low pressure of air can be used for testing the succesive cigarettes thereby to avoid compression of the air with a corresponding increase in the accuracy of the test results. With the last described arrangement, the ball 93 will fall from its raised position where it obstructs the beam of light from source 94 only when a defective filter cigarette unit is undergoing tests and thereby results in a reduction in the pressure of air issuing from nozzle 89.

In the modified arrangement of the testing and signalling device illustrated in FIG. 4, and which may be substituted for the device 28 of FIG. 3, a suitably mounted transparent tube 788 is interposed between the light source and photoelectric cell and has a nozzle 789 secured in its lower end portion by a set screw 786. The nozzle 789 is adapted to be connected to the pipe 27 extending from the test block 25 so that a flow of air under pressure issues upwardly from nozzle 789 through tube 788 to drive a ball of sphere 793 upwardly within the latter. An open ended pipe 791 is inserted into the upper end of transparent tube 788 and has notches 792 at its lower end to define a stop limiting upward movement of ball 793 at a location obstructing the path of the beam of light from the light source to the photoelectric cell. The pipe 791 is held in its axially adjusted position by a set screw 99, and a needle valve 700 is threadably carried by pipe 791 and extends into the bore of the latter to adjustably vary the size of the discharge orifice from pipe 791.

The device described above with reference to FIG. 4 operates in substantially the same manner as the testing or signalling device 28 of FIG. 3, and may be further modified by replacing the ball 793 with a cylinder 893 which is freely slidable within the transparent tube 888, as shown in FIG. 5.

Referring now to FIG. 6, it will be seen that a testing apparatus constructed in accordance with another embodiment of the invention, and which may be used in place of the testing apparatus 2 previously described in connection with FIG. 2, is there generally identified by the reference numeral 100. The testing apparatus 100 generally includes a test drum 103 rotatable on an axle or spindle 101 which is suitably mounted at one end thereof. As shown particularly in FIG. 7, the test drum 103 has spaced apart, radially outwardly directed flanges 170 and 210 fixed thereon for rotation with the drum. Between the flanges 170 and 210, there are secured to the surface of drum 103 groups of axially aligned concave carriers 104, 105, 106 and 107, which groups are equally spaced apart in the circumferential direction. Radial suction ports 181 formed in the drum 103 open, at their outer ends, in the concave seats of carriers 104, 105, 106 and 107 and, at their inner ends, communicate with axial suction ducts 182 formed in drum 103 and opening at an end surface 108 of the latter. The drum 103 is further formed with radial compressed air ports 141 opening, at their outer ends, at the surface of the drum between carriers 104 and 105 and carriers 106 and 107, while the inner ends of ports 141 communicate with axially extending compressed air ducts 142 which also open at the end surface of the drum at locations spaced radially inward from the ducts 182.

Axial bores 171 and 211 (FIG. 7 and FIGS. 9a and 10a) are formed in flanges 170 and 210 at locations axially aligned with the opposite ends of each group of the carriers 104–107. A slide valve 172 (FIG. 9a) is axially movable in each bore 171 of flange 170 and is yieldably urged in the direction away from the related group of carriers by a compression spring 173 (FIG. 7) disposed on the slide valve between the flange 170 and a flange or rim 174 on the slide valve. Each slide valve 172 is adapted to be axially displaced in opposition to the related spring 173 by levers 175 which are pivotally mounted on a bracket 178 secured to flange 170 and which carry a cam follower roller 176 adapted for rolling engagement with cams 168 and 177 which are indicated in broken lines on FIG. 7 and which are suitably secured within a stationary hood 102 (FIG. 6) mounted on the free end portion of axle 101 and extending around the adjacent end portion of test drum 103.

As shown in FIG. 9a, each slide valve 172 has a coupling member 230 at its end facing towards the related group of carriers 104–107 and adapted to effect sealing engagement with the adjacent end of a filter cigarette unit G supported by the related carriers. Further, the slide valve 172 has an axial bore 234 extending from the coupling member 230 and communicating, at its inner end, with a diametrical bore 233 opening into an annular groove 232 in the surface of the slide valve. The annular groove 232 is disposed along the slide valve 172 so that, when the latter is axially displaced by the action of either cam 168, as in FIG. 9a, or by the action of cam 177, annular groove 232 is in communication with a related port 192 formed in the flange 170 and opening at the outer peripheral surface of the latter.

As shown in FIG. 10a, each valve 212 slidable in a bore 211 of flange 210 has a guide block 213 secured to the valve for axial movement with the latter and carrying a cam follower roller 214. The guide block 213 is acted upon by a torsion spring 215 (FIG. 7) which yieldably urges the related valve 212 in the axial direction away from the associated group of carriers 104–107. The inner end of each slide valve 212 is formed as a coupling member for sealing engagement with the adjacent end of a filter cigarette unit G supported by the related carriers 104–107 when the valve 212 is displaced axially in opposition to the related spring 215 by the engagement of its cam follower roller 214 with a fixed cam 216 (FIGS. 7 and 10b) which is suitably mounted adjacent the end of drum 103 having the flange 210 thereon. Each slide valve 212 is in the form of a tubular member slidable on a pin 155 carried by the flange 210, and the inner surface of valve member 212 is formed with an annular groove 159 which, when the valve 212 is axially displaced by the action of cam 216, as in FIG. 10b, communicates simultaneously with radial bores 157 and 158 formed at axially spaced apart locations in the pin 155 and opening, at their inner ends, into axial bores 154a and 154, respectively, which are otherwise segregated from each other. The axial bore 154a opens at the end of pin 155 directed toward the associated group of carriers 104–107, while the bore 154 extends to a radial bore 109 in flange 210 which, in turn, communicates with a radial duct 153 for compressed air formed in drum 103. Thus, compressed air is supplied through each valve 212 only when the latter is axially displaced by the action of cam 216, which axial displacement is also effective to engage the inner end or coupling portion of the valve member with the end of a filter cigarette unit G supported by the related carriers. The inner ends of the radial ducts 153 provided for the several valves 212 communicate with an axially extending bore 152 formed in the spindle or axle 101, while the bore 152 in turn communicates with a connecting piece 151 (FIG. 6) through which connection is made to a source or supply of compressed air (not shown) by way of a flexible hose 150.

As shown on FIG. 7, the drum 103 has a reduced diameter extension 200 at the end thereof adjacent flange 170, and a rotary valve 202 is turnably mounted in extension 200 for each of the groups of carriers 104–107 on the drum. Each rotary valve 202 is turnable about an axis extending radially with respect to the axis of rotation of drum 103 and is provided with diametrically extending bores 207 and 208 at right angles with respect to each other which bores are capable of being alternatively aligned with the axially extending ducts 182 and 142, respectively, associated with the related group of carriers, as is apparent in FIGS. 9a and 9b. A control knob 203 is fixed on the outer end of each rotary valve 202, and a control lever or arm 21 and a restoring arm 204 extend radially from each knob 203 in substantially diametrically opposed directions. Further, a helical compression spring is disposed on each rotary valve 202 between the knob 203 and the outer surface of the drum extension 200 to act as a frictional brake for preventing inadvertent turning of the rotary valve.

Mounted non-rotatably on the spindle or axle 101 and urged axially by a spring 222 (FIG. 9b) is an air control ring 220 which is shown in detail on FIGS. 8a and 8b. The ring 220 has a radial sealing surface 221 for slidable contact with the end surface 108, and hose connections 143, 164 and 183 extend radially outward from ring 220 at suitably circumferentially spaced apart locations. The hose connections 143 and 164 communicate with the outer ends of radial bores 144 and 165 formed in ring 220, while the inner ends of the bores 144 and 165 open into a slot or groove 145 extending along a substantial portion of the circumference of the inner peripheral surface of ring 220. Further, the groove 145 communicates through a radial channel 166 with a port 167 opening axially at the face 221 of ring 220 and being radially located for communication with the successive axial ducts 182 of drum 103. The ring 220 further has a concentric, arcuate slot 146 opening at the face 221 and being radially located for communication with the axial ducts 142 of drum 103, with a radial duct 147 establishing communication between the groove 145 and the arcuate slot 146. Finally, the hose connection 183 communicates through a radial bore 184 with an arcuate slot or channel 185 which extends over a substantial portion of ring 220 and opens at the face 221 of the latter at a radial location for communication with the axial ducts 182 of drum 103. The ring 220 also has a bore 186 extending axially therethrough and opening, at one end, at a location for communication with the axial ducts 182, while the other end of bore 186 opens to the atmosphere.

The port 167 of ring 220 is circumferentially located so that it will register with the axial duct 182 associated with the group of carriers 104–107 prior to the movement of the latter to the station at which a filter cigarette unit G is received by such group of carriers. The arcuate slot 146 extends along a portion of the circumference of ring 220 which corresponds to the station at which defective filter cigarette units are to be ejected from the drum 103, while the arcuate slot 185 extends along the circumferential portion of ring 220 corresponding to the normal travel of each filter cigarette unit on the drum 103 between the station at which each filter cigarette unit is received from the rolling drum 3 and the location at which the satisfactory units are transferred to the cutting drum 24 (FIG. 1).

As shown in FIG. 6, the compressed air for effecting the ejection of defective filter cigarette units and for cleaning out the successive slide valves 172 is conveyed from a suitable source or supply thereof (not shown) through a conduit 140 which extends through the hood 102 and is secured to the hose connection 143 of ring 220. Similarly, the connection to a suitable vacuum source (not shown) is by way of a conduit 180 which extends through the hood 102 and attaches to the hose connection 183. The remaining hose connection 164 of ring 220 is connected to a conduit or hose 160 which is coupled through a connector 161 with the bore 163 of a block 162 which is fixedly mounted so as to effect sealing engagement with the outer periphery of flange 170 at a location prior to the station at which filter cigarette units are deposited in the successive groups of carriers. As shown on FIG. 9a, the previously mentioned cam 168 is fixedly mounted on the same bracket as the block 162 so that, as a port 192 in flange 170 comes into alignment with the bore 163 of block 162, the cam follower roller 176 of the related valve 172 is engaged by the cam 168 to effect axial displacement of the related slide valve 172, whereby compressed air is directed through the valve 172 and out of the related coupling member 230 to remove any tobacco particles that might be lodged therein and would otherwise cause clogging of the valve.

The bracket supporting the block 162 further adjustably carries a restoring pin 206 (FIG. 9a) which projects radially into hood 102 and is disposed adjacent the path of travel of the valves 202 with the rotated drum 103. The pin 206 is located so that, as each rotary valve 202 passes thereby, a control lever or arm 204 of the rotary valve is engageable with the pin 206 to ensure that the rotary valve will be positioned as shown on FIG. 9a, that is, with its bore 207 aligned with the related axial duct 182 to permit compressed air to flow from the port 167 of ring 220 through the duct 182 for cleaning out the suction ports 181 which might otherwise become clogged with tobacco particles during long continued use of the testing apparatus.

After a particular group of carriers 104–107 has passed the location of the block 162, the related rotary valve 202 remains in the position illustrated on FIG. 9a and thereby permits communication between the arcuate slot or duct 185 of ring 220 and the axial duct 182 for applying suction to the ports 181 at the time when a filter cigarette unit G is deposited in the group of carriers. Thus, suction is employed for securely holding the filter cigarette unit against the group of carriers 104–107 until the latter reach the station at which a satisfactory unit is transferred to the cutting drum, or until the group of carriers reaches the ejection station, in the case of a defective filter cigarette unit, as hereinafter described in detail. As shown in FIG. 11, the carrier 105 of each group has its concave seat or surface formed with an axially opening groove 187 therein so that, when the communication with the source of vacuum is interrupted, either for transfer of the filter cigarette unit to the cutting drum or for ejection of a defective unit, the vacuum in the respective axial duct 182 may collapse immediately so as to avoid interference with removal of the filter cigarette unit from the carriers.

After the valve 172 and the ports 181 associated with a group of carriers 104–107 have been cleared by reverse flows of air therethrough, as described above, the group of carriers passes the receiving station where a filter cigarette unit is deposited on the carriers and held against the latter by suction then acting at the ports 181. The group of carriers then transports the filter cigarette unit in the direction of the arrow 135 on FIG. 6 past a testing station along which the cams 177 and 216 extend for axially displacing the related slide valves 172 and 212, respectively. Such axial displacement of the slide valves causes the coupling members or inner end portions thereof to come into sealing engagement with the adjacent ends of the filter cigarette unit on the related carriers. Further, the axial displacement of the valve 212 places the adjacent end of the filter cigarette unit in communication with the supply of compressed air (FIG. 10b) by way of the associated radial duct 153 and the axial bore 152 in the axle 101. The axial displacement of the valve 172 further establishes communication between the adjacent ends of the filter cigarette unit engaged thereby and the related port opening at the peripheral surface of flange 170.

As shown on FIG. 6, a test block 190 is fixedly mounted at the testing station and has an arcuate surface in sealing engagement with the outer peripheral surface of flange 170. Such arcuate surface of test block 190 is formed with an elongated groove or slot 191 having a length along the circumference of flange 170 that is approximately equal to the circumferential distance between adjacent ports 192 in the flange so that at least one of the ports 192 is always in communication with the slots 191. A conduit 193 extends from the slot 191 of test block 190 through the fixed hood 102 to an air filter 194 (FIG. 6), and a flexible tube 196 extends from the outlet connection 195 of filter 194 to an inlet connection 197 provided on the testing or signalling device 110 which, in the embodiment of the invention illustrated on FIG. 6, is mounted coaxially on the outer or free end of the fixed axle or spindle 101.

The testing or signalling device 110 includes a generally cylindrical housing 113 with a removable cap or lid 111 at one end having a transparent window 112 therein. As shown particularly on FIG. 12, the operating components of the testing or signalling device 110 are generally similar to those of the device 28 previously described herein with reference to FIG. 3. Thus, the device 110 is seen to include a transparent, substantially vertical tube 114 within the housing 113 and having its lower end mounted in a tubular support 198 fixed by a retaining block 115 and into which the hose connection 197 opens. An adjustable lower stop 117 extends upwardly through pipe 198 into the lower portion of transparent tube 114 to limit the downward travel of a movable member 118, shown in the form of a cylinder, and being freely vertically movable within the tube 114. The upper end portion of tube 114 extends into a block 116 and communicates with a bore 199 formed in the block 116 and opening to the atmosphere, as at 199a, at the outer surface of housing 113. Thus, air under pressure introduced through the hose connection 197 can flow upwardly through tube 114 and be exhausted from the latter through the bore 199. The upward movement of the member 118 under the influence of the upward flow of air through pipe 114 is limited by an adjustable stop 119 threaded in block 116 and extending into the upper end portion of tube 114 with clearance therebetween. A light source 240 is mounted within housing 113 and directs a beam of light through a laterally extending duct 241 which diametrically intercepts the transparent tube 114 at a location immediately under the lower end of adjustable stop 119, and a photoelectric cell 242 is mounted within the block 116 to be energized by light passing from source 240 and through duct 241 and tube 114.

As in the previously described embodiment of this invention, when the filter cigarette unit G being tested is satisfactory, that is, without any leaks in the wrappers of its cigarettes or in the connection between the cigarettes and the double filter plug, then the air under pressure supplied to one end of the filter cigarette unit through the associated valve 212 must all flow through the filter cigarette unit and through the valve 172 engaged with the opposite end of the latter for exhaust through the related port 192 into theslot 191 of test block 190. The air thus passing through the filter cigarette unit is further conveyed through the conduit 193, filter 194 and hose 196 to the inlet connection 197 of device 110 and then upwardly through the transparent tube 114 to hold the movable member 118 against the upper stop 119, in which position the member 118 obstructs the beam of light from light source 240 so that the photoelectric cell 242 is deenergized. However, if the filter cigarette unit being tested has one or more leaks therein so that at least some of the air under pressure introduced at one end of the filter cigarette unit through the valve 212 can escape to the atmosphere through the leaks, thereby reducing the pressure of the air entering at the inlet connection 197 of device 113, then the speed of air flow in transparent tube 114 is correspondingly reduced and movable member 118 descends, for example, to the position shown in FIG. 12, and the beam of light from source 240 can impinge on photoelectric cell 242 for energizing the latter, thereby causing an electrical signal or impulse to be emitted by the photoelectric cell.

The electrical signal or impulse from photoelectric cell 242 is transmitted through conductors in a cable 133 to a suitably mounted control unit 130 (FIG. 6) which, for example, may include relays energized by the signal from the photoelectric cell for completing an energizing circuit of a solenoid or electromagnet 127 in an ejection control device 120 (FIGS. 6 and 9b), which energizing circuit further includes conductors in a cable 131 extending to the control unit 130 from the usual electrical supply lines and conductors in a cable 132 extending from unit 130 to the solenoid of ejection control device 120.

The ejection control device 120 includes a housing 124 which is adjustably mounted, by means of screws 123 engaging in slots 122, on a bracket 121 which extends from the housing 113 of testing or signalling device 110. As shown on FIG. 9b, the solenoid or electromagnet 127 is disposed within housing 124 so that, upon energization of the electromagnet, its core 127a can attract the head 126 which is adjustably mounted on an actuating lever 125 pivotally mounted, at one end, within housing 124. The free end portion of lever 125 projects out of housing 124 and through a slot into the hood 102 so that, when the actuating lever 125 is moved to the position shown in full lines on FIG. 9b in response to energization of the electromagnet 127, the free end of lever 125 projects into the path of travel of the control lever 201 on the rotary valve 202 associated with the group of carrier 104–107 then passing the ejection station. Thus, when electromagnet 127 is energized, the engagement of actuating lever 125 with the control lever 201 causes turning of the associated rotary valve 202 to the position shown on FIG. 9b, in which position the bore 208 of valve 202 is aligned with the axial duct 142 of drum 103 associated with the group of carriers then at the ejection station. Thus, compressed air can flow from the slot 146 of air control ring 220 and through axial duct 142 to issue as jets of compressed air through the related ports 141 for ejecting the defective filter cigarette unit from the related group of carriers, as shown on FIG. 6.

When a rotary valve 202 is turned, as described above, to permit jets of compressed air to issue from the ports 141 associated with the group of carriers at the ejection station, the valve 202 blocks or obstructs the axial duct 182 associated with that group of carriers, as shown on FIG. 9b, so that the communication between the ports 181 and the source of vacuum is simultaneously interrupter and, as previously described herein, the groove 187 formed in the seat of each carrier 105 ensures the rapid breakdown of suction in the duct 182 so that the ejection of a defective unit G will not be resisted by suction.

When the electromagnet 127 is deenergized, a tension spring 128 connected to the actuating lever 125 moves the latter against an adjustable stop screw 129 to the position shown in broken lines on FIG. 9b where the free end of lever 125 is disposed out of the path of travel of the control levers 201 on the rotary valves 202 associated with the groups of carriers 104–107 passing the ejection station. Thus, if the tested cigarette is satisfactory, so that an impulse or signal is not emitted by the photoelectric cell 242 for effecting energization of electromagnet 127, the rotary valve 202 associated with the group of carriers supporting the satisfactory filter cigarette unit G remains in its position shown on FIG. 9a, that is, with the associated axial duct 182 being open while the duct 142 is obstructed, thereby to maintain communication between the ports 181 and the source of vacuum for holding the satisfactory unit G against the carriers during passage of the ejection station.

When the group of carriers supporting a satisfactory unit G reaches the discharge station, at which the satisfactory unit G is to be transferred to the cutting drum 24 (FIG. 1) the axial duct 182 associated with that group of carriers reaches the end of the arcuate slot 185 of air control ring 220 (FIG. 8b) thereby to interrupt the communication between the ports 181 and the source of vacuum. Immediately thereafter, the axial duct 182 comes into communication with the axial bore 186 extending through ring 220 and opening to the atmosphere, so that the suction in the duct 182 collapses to permit transfer of the filter cigarette unit.

Those rotary valves 202 which were turned by the actuating lever 125 to the position shown in FIG. 9b so as to effect ejection of defective filter cigarette units at the ejection station are restored to the position shown on FIG. 9a, prior to the delivery of new filter cigarette units to the related groups of carriers by the action of the restoring pin 206 upon the arms or levers 204 of the turned rotary valves.

As in the embodiment of the invention previously described herein with reference to FIG. 2, the apparatus of FIG. 6 has the advantage of employing a single testing or signalling device 110 in association with the numerous groups of carriers 104–107 on the testing drum 103. Further, since the slot 191 of test block 190 is always in communication with one of the ports 192 of flange 170, it will be apparent that, so long as satisfactory cigarettes are being successively tested, the movable member 118 of device 110 will remain in its raised position against stop 119 to prevent the emitting of signals by the photoelectric cell 242. Thus, the inertia of member 118 need not be overcome during each testing cycle so that a relatively low air pressure may be used for the testing of the filter cigarette units to avoid compression of the air and thereby increase the sensitivity and accuracy of the testing apparatus.

Referring now to FIG. 13a, it will be seen that the testing device 110 of the apparatus embodying this invention may be conveniently modified so as to test for inadequate filling of the filter cigarette units as well as for leaks in the wrappers thereof. In accordance with such modification, the stop 250 limiting the upward movement of the member 118 is in the form of an elongated pin which is vertically slidable through a bore 251 at the lower end of a guide tube 252. The upper end portion 257 of the elongated pin or rod 250 is slidably guided in a bore 253 of a set screw 254 which is adjustably threaded in the upper end of guide tube 252. A helical compression spring 255 extends around rod or pin 250 between the adjustable set screw 254 and an abutment disk 256 fixed on the pin or rod 250. Engagement of the abutment disk 256 with the bottom of guide tube 252 limits the downward travel of the rod or pin 250 under the influence of spring 255 so that its lower end normally arrests the upward travel of the movable member 118 at the position where it obstructs the beam of light directed toward the photoelectric cell. If the wrapper of the filter cigarette unit or other tobacco product being tested has leaks therein, so that the pressure causing upward flow of air through the transparent tube containing the member 118 is diminished, the member 118 falls within the transparent tube, as previously described herein, to permit the beam of light to impinge on the photoelectric cell causing the latter to emit an electrical signal or impulse for effecting ejection of the defective unit. However, if the tobacco or other filling of the filter cigarette unit is inadequately compacted or has holes therein, thereby diminishing the resistance to flow of air through the tested unit, then the increased rate of flow of air through the transparent tube of the testing or signalling device drives the movable member 118 further upward to correspondingly displace the movable stop rod or pin 250 against the resistance of the spring 255, as shown in FIG. 13b. Thus, in the case of a tested unit having inadequate filling, the member 118 is again moved out of the path of the light beam so that the photoelectric cell 242 is also energized in this case to cause ejection of the defective unit.

FIGS. 14a and 14b illustrate another modification of the testing device 110 by which the latter can be made sensitive to defective filling of the filter cigarette units as well as to leaks in the wrappers thereof. In the modification of FIG. 14a, the transparent tube 260 which contains the vertically movable member 118 has a diameter that increases progressively in the upward direction. When normal or satisfactory units are being tested, the pressure of air supplied to the lower end of tube 260 is such that the rate of air flow possible through the annular clearance between member 118 and tube 260 at the level of the photoelectric cell 242 will be adequate to exactly balance the weight of the member 118, whereby the member 118 is maintained at the position obstructing the beam of light directed toward the photoelectric cell. Although the upper adjustable stop 261 is remote from the member 118 in this normal position of the latter, any further upward movement of member 118 toward stop 261 results in an increase in the area of the annular clearance between member 118 and the inner wall surface of tube 260 which thereby decreases the resistance to flow and the pressure acting upwardly on member 118 so that, during the testing of normal cigarettes, the member 118 cannot rise above the position illustrated on FIG. 14a. However, if a filter cigarette unit with inadequate filling is being tested, thereby to increase the pressure of air admitted to the lower end of tube 260, such increased pressure of air is adequate to lift the member 118 above the beam of light and against the adjustable stop 261, as shown in FIG. 14b, so that the photoelectric cell 242 is again energized for emitting a signal causing ejection of the defective filter cigarette unit.

Figure 15:
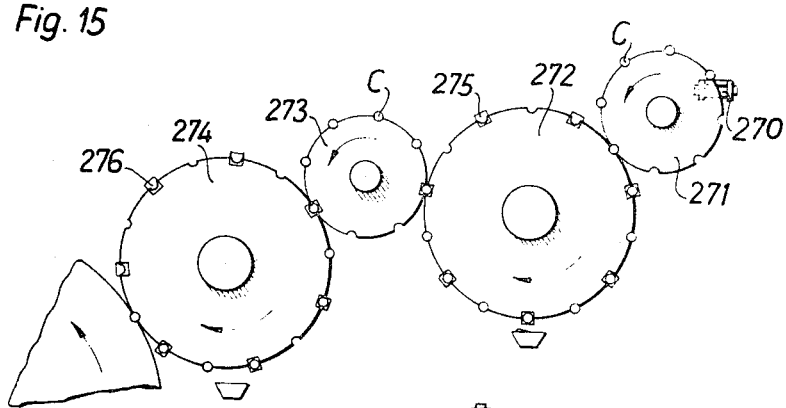
FIG. 15 is a diagrammatic view of a testing apparatus embodying the present invention and having two conveyor drums arranged in series so as to permit testing of cigarettes at an extremely high rate of speed.
Figure 16:
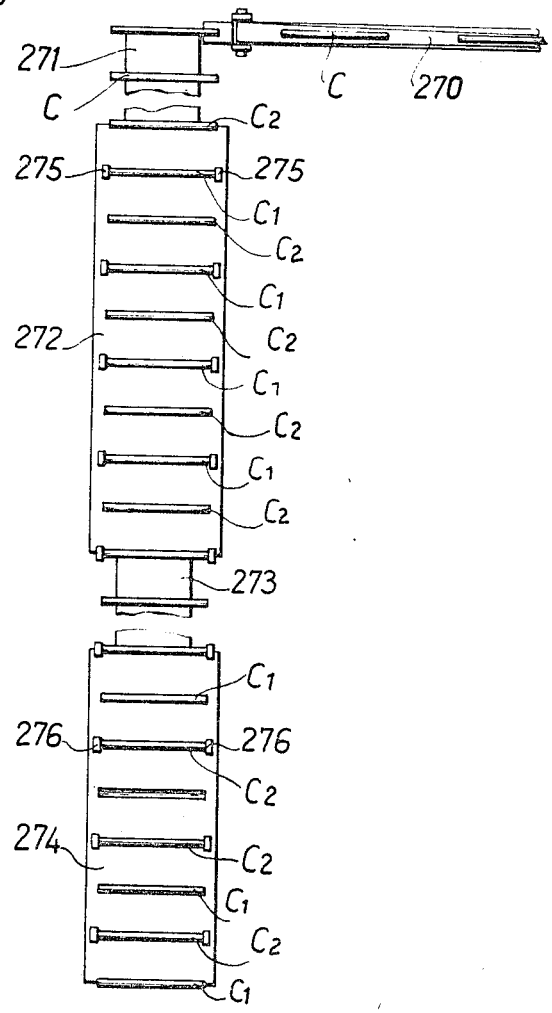
FIG. 16 is a diagrammatic bottom view of the arrangement illustrated on FIG. 15.

Although the testing apparatus embodying this invention, as described above with reference to FIGS. 2 and 6, respectively, are capable of the high speed testing of filter cigarette units or other tobacco products, the speed at which the testing is conducted may be further increased by resorting to the arrangement illustrated diagrammatically on FIGS. 15 and 16. Such an arrangement may be employed for the testing of cigarettes C issuing at a high rate of speed from a cigarette making machine and includes a distributor drum 271 having spaced apart grooves or carriers on its periphery which successively receives the cigarettes C from the discharge conveyor belt 270 (FIG. 16) of the cigarette making machine. The successive cigarettes are transferred from distributor drum 271 to grooves or carriers on a first testing drum 272, and are transferred from the latter by way of an intermediate drum 273 to a second testing drum 274. The testing drums 272 and 274 may be of the kind previously described in detail herein with reference to FIG. 2 or FIG. 6, with the exception that the testing drum 272 has valves and coupling members, for example, the valves 7 of FIG. 2 or the valves 172 and 212 of FIG. 6, associated only with every second groove or carrier, as at 275, thereby to effect testing of every second cigarette, indicated at $C_1$ on FIG. 16. Similarly, the second testing drum 274 has valves and coupling members 276 associated only with every second groove or carrier thereon receiving from the intermediate drum 273 those cigarettes $C_2$ which were not previously tested on the drum 272.

If the testing apparatus 100 of FIG. 6 is embodied in each of the testing drums 272 and 274 of FIGS. 15 and 16, then the slot 191 of the test block 190 is lengthened so that one of the ports 192 at the location of every second group of carriers will always communicate with the slot 191 to prevent actuation of the ejection control unit 120 so long as every second cigarette on the related drum, that is, the cigarettes being tested thereon, is satisfactory. Since the circumferential spacing between the cigarettes being tested on each of the drums 272 and 274 is doubled, the speed of rotation of the drums 272 and 274 can be similarly doubled for correspondingly increasing the rate of speed at which cigarettes pass through the testing apparatus without adversely affecting the sensitivity or accuracy of the testing operation.

Figure 17:
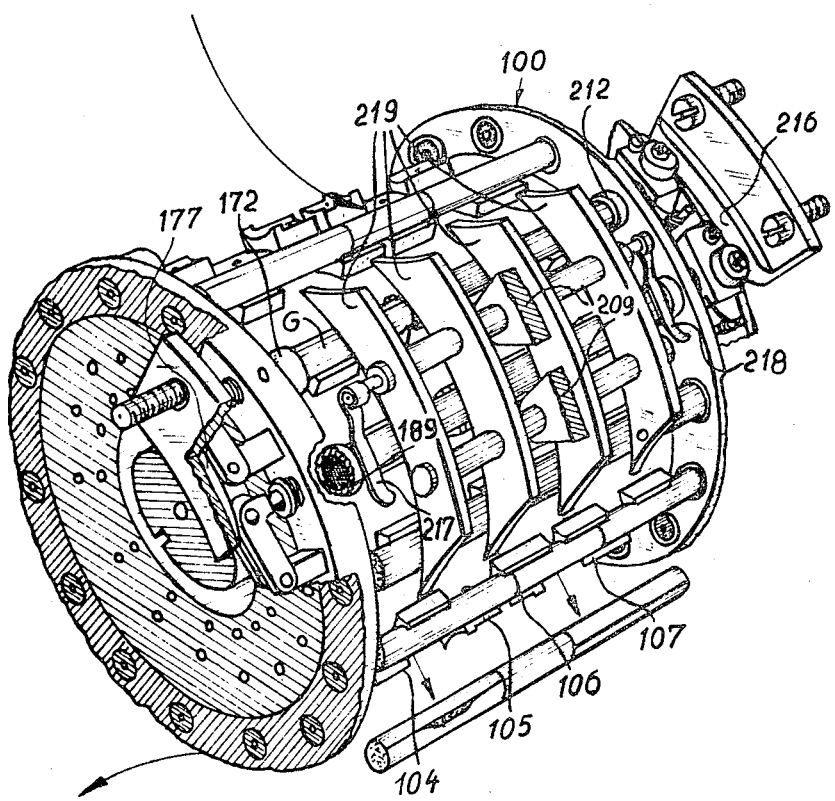
FIG. 17 is a perspective view of part of the conveying drum according to FIG. 7 and shows support means and pressing means for the cigarettes in the testing region.

FIG. 17 shows a modified construction of test drum 100 in which the region of the testing position of the slide valves 172 and 212 support means in the form of several guides 219 are arranged concentrically with the test drum 100, and which allow a free passage of testing air to pass through the units G but prevents units G from being raised off carriers 104–107. The support means are connected in a known manner by holders 209 to the machine frame. At the ends of cams 177 and 216 where the slide valves 172 and 212 are removed from the units G springy guides 217 and 218 retain the units G and prevent their axial movement.

Filters 189 constructed of fine wire gauze are inserted in the slide valves 172. Particles of tobacco or other material which are blown out of the units G are prevented by these filters 189 from entering the testing holes, the ducts and getting into the testing or signalling device.

Even with an unusually low air pressure of about 15 mm. of water the existance of such particles in the path of the testing or controlling air can be very injurious to the testing or signalling device and also cause incorrect testing values.

As shown in FIG. 6 the connecting piece 151 and the inlet connection 197 are formed as adjustable valves so that the strength of the compressed air as well as the controlling air to the testing means can be varied.

This is a very important factor to be considered should it be necessary to change the kind of cigarette being tested or to correct the air pressure during the operation of the machine, e.g. if the actual condition of the cigarette changes during the day.

Although illustrative embodiments of this invention have been described in detail herein with reference to the accompanying drawings, it is to be noted that the invention is not limited to those precise embodiments, and that various changes and modifications may be effected therein without departing from the scope or spirit of the invention, which is intended to be defined in the appended claims.

We claim:

1. In an apparatus for testing the integrity of elongated rod-shaped articles, particularly cigarettes and filter cigarettes intended to have only two spaced end openings connected by a restricted flow path, conveying means arranged to advance the articles sideways past a testing station so that the articles form a single file of consecutive articles; a plurality of consecutive inlet and outlet means provided on said conveying means and arranged to engage the consecutive articles so that each thereof communicates with one end opening of an article while the articles advance consecutively past said testing station; means for supplying compressed fluid to consecutive inlet means while the corresponding articles advance past said testing station; and a fixed testing device comprising fluid conveying means arranged to communicate with consecutive outlet means while the respective articles advance past said testing station so that streams of fluid which pass through such consecutive articles thereupon pass through said testing device, said testing device being operative to initiate ejection of defective articles whenever the characteristics of a fluid stream passing through an article and thereupon through said testing device deviate from a predetermined norm which is indicative of a satisfactory article.

2. An apparatus for testing the integrity and flow resistance of elongated hollow articles intended to have only two spaced openings provided in the ends thereof and connected by a restricted flow path, comprising conveying means having carriers operative to transport the articles to be tested along a predetermined path from an article receiving station to an article discharging station and past a testing station and a defective article ejecting station arranged successively between said article receiving and discharging stations; a pair of fluid conducting inlet and outlet means associated with each of said carriers and movable with said conveying means along said path and being respectively engageable with the two ends to communicate with the respective openings of an article transported by the related carrier during movement of the latter past said testing station; stationary means arranged to supply fluid under pressure to consecutive inlet means during movement of the related carriers past said testing station; stationary fluid conveying means extending from said testing station and there communicating with the outlet means associated with a given carrier then passing said testing station to that a flow of fluid occurs through the article transported by said given carrier; a single testing device connected with said fluid conveying means to receive a flow of fluid under pressure through the articles passing consecutively the testing station and operative to provide a signal upon deviation of said flow from a predetermined value by reason of a defect in an article passing the testing station; and means actuated in response to a signal from said testing device to remove a defective article from the related carrier as the latter passes said ejecting station.

3. An apparatus as set forth in claim 2, wherein said testing device includes a generally vertical tube connected at its lower end to said fluid conveying means so that the flow of fluid under pressure passes upwardly through said tube, a member movable vertically in said tube under the influence of said flow of fluid through the latter so as to maintain a predetermined level in said tube when said flow is at said predetermined value, and signal producing means responsive to the movement of said movable member from said predetermined level.

4. An apparatus as set forth in claim 3, wherein said tube is transparent and said movable member is substantially opaque, said signal producing means including a light source directing a beam of light through said tube at said predetermined level so as to be normally obstructed by said opaque member and a photoelectric cell disposed to be energized by said light beam and to hereby emit an electrical signal only upon movement of said opaque member out of the path of the light beam.

5. An apparatus as set forth in claim 3, wherein said testing device further includes adjustable stop means extending into the upper end of said tube to resist upward movement of said movable member beyond said predetermined level so that said member descends from said level upon reduction of the flow of fluid through the tube resulting from leaks in the article passing the testing station.

6. An apparatus as set forth in claim 5, wherein said adjustable stop means is vertically movable in said tube and further comprising resilient means yieldably holding said stop means at a position engageable by said movable member at said predetermined level so that, when said flow exceeds said predetermined value by reason of an inadequate flow resistance of the article passing the testing station, said movable member is displaced upwardly from said predetermined level against the opposition of said resilient means.

7. An apparatus as set forth in claim 3, wherein said tube progressively increases in diameter in the upward direction so that said movable member moves upwardly and downwardly from said predetermined level when said flow is respectively greater and less than said predetermined value.

8. An apparatus as set forth in claim 3, wherein said outlet means associated with each carrier terminates in a port opening at a surface of said conveyor means, each of said ports being spaced an equal distance from the ports of the outlet means associated with the adjacent carriers and said fluid conveying means including a member seating against said surface of the conveying means and having a slot substantially equal in length to said distance between the successive ports to always communicates with one of said ports and to thereby insure that a continuous flow of fluid is maintained through said tube for action on said movable member in the latter.

9. An apparatus as set forth in claim 2, wherein each of said carriers has first and second ports opening therein and further comprising means for connecting said first ports with a suction generator, means for connecting said second ports with a source of compressed air, and valve means for each carrier normally opening the connection between said first ports and the suction generator and closing the connection between said second ports and said source of compressed air so that suction acts at said first ports for holding an article against the related carrier during movement of the latter from said receiving station to said discharging station, said means actuated in response to a signal from said testing device being operative to displace said valve means associated with the carrier holding the defective article to close the connection with said first ports and to open the connection with the second ports so that compressed air jets issue from the latter for removing the defective article.

10. An apparatus as set forth in claim 9, wherein said means for connecting with the first and second ports includes first and second ducts, respectively, and said valve means includes a rotary valve interposed in both of said ducts and having bores at right angles to each other for alternative alignment with said first and second ducts, respectively, by turning of the valve.

11. An apparatus as set forth in claim 10, wherein each of said rotary valves has a control lever extending therefrom and wherein said means actuated in response to a signal from said testing device includes a movable actuating member normally disposed out of the path of travel of said control lever of each rotary valve with said conveying means and being moved into said path of the control lever upon receipt of a signal to thereby turn said rotary valve to the position in which said first duct is closed and said second duct is open.

12. An apparatus as set forth in claim 11, further comprising means for returning each rotary valve to its position where said first duct is open and said second duct is closed prior to return of the related carrier from said discharging station to said receiving station.

13. An apparatus as set forth in claim 12, further comprising means operative to blow reversed flows of compressed air through said outlet means and said first ports of each carrier prior to the return of the latter from said discharging station to said receiving station to thereby avoid clogging of said outlet means and first ports.

14. An apparatus as set forth in claim 11, further comprising means at said discharging station defining a vent connecting said first duct of the carrier passing said discharging station with the atmosphere to thereby release the article from the corresponding carrier.

15. An apparatus as set forth in claim 11, wherein each of said carriers has a relief passage opening to the atmosphere from at least one of said ports when an article is held by the carrier so that, when the connection of said first duct with the suction generator is interrupted, the suction in said first duct is relieved rapidly through said relief passage.

16. An apparatus as set forth in claim 2, wherein said conveying means includes a rotary drum having axially spaced first and second flanges with said carriers extending axially on the periphery of the drum between said flanges and being equidistant from each other, said inlet and said outlet means being axially movable in said first and second flanges, respectively, and further comprising fixed cams adjacent said first and second flanges and acting on said inlet and outlet means, respectively, to urge the latter axially into engagement with the article held by the related carrier.

17. An apparatus as set forth in claim 16, further comprising resilient means acting on each of said inlet and outlet means to urge the latter to inoperative positions axially away from the related carrier, each of said inlet and outlet means being a slide valve which is closed in said inoperative position and which is opened when axially displaced by the related one of said cams.

18. An apparatus as set forth in claim 17, further comprising a fixed spindle rotatably supporting said drum, said stationary means supplying fluid to each of said inlet means including a bore in said spindle for communication with a source of the fluid under pressure and a radial duct in said drum for each carrier opening from said bore and communicating with the related slide valve constituting an inlet means when said slide valve is opened.

19. Apparatus for testing the condition of cigarettes and similar articles having open-ended tubular wrappers, comprising conveying means for conveying the articles successively along a predetermined path; means for testing the articles while the articles travel along a predetermined zone of said path including means for introducing air thereinto so as to create consecutive air currents each indicative of the condition of one of the articles tested; means for collecting said air currents into an air stream wherein each such current corresponds to an increment of the air stream; and means for comparing the characteristics of successive increments of the air stream with a predetermined norm so as to determine which of the tested articles is satisfactory.

20. Apparatus as set forth in claim 19, further comprising means for engaging spaced portions of wrappers on articles travelling along said predetermined zone so that each wrapper held by such engaging means is confined around its circumference at two locations in the regions of its respective ends while the major part of the circumference of the thus held wrapper remains unconfined by said engaging means, said engaging means being provided on and travelling with said conveying means and including means for maintaining the wrappers of articles out of contact with said conveying means.

21. Apparatus as set forth in claim 19, wherein said air currents are conveyed along a preselected path which includes a chamber immediately adjacent to one end of the wrapper on an article travelling along said predetermined zone so that the respective air current passes through such chamber while being conveyed along said preselected path, the transverse dimension of said chamber being at least equal to the diameter of a wrapper.

22. Apparatus as set forth in claim 19, wherein said conveying means comprises a rotary drum which conveys the articles along said predetermined zone, and further comprising means for engaging spaced portions of wrappers on articles traveling along said predetermined zone so that each wrapper held by such engaging means is confined around its circumference at two locations in the regions of its respective ends while the major part of the circumference of the thus held wrapper remains unconfined by said engaging means, said engaging means comprising arcuate guide means concentrically surrounding said drum and engaging the wrappers of articles travelling along said predetermined path downstream of said predetermined zone.

23. Apparatus as set forth in claim 19, wherein said testing means comprises an electropneumatic transducer.

24. Apparatus as set forth in claim 19, wherein said conveying means comprises a hollow rotary drum which conveys the articles along said predetermined zone, and further comprising means for engaging spaced portions of wrappers on articles travelling along said predetermined zone so that each wrapper held by such engaging means is confined around its circumference at two locations in the regions of its respective ends while the major part of the circumference of the thus held wrappers remains unconfined by said engaging means, said engaging means comprising axially aligned groups of carrier means provided on the periphery of said drum for supporting the articles and for maintaining the entire wrapper of each article out of contact with and radially outwardly of the periphery of said drum.

25. Apparatus as set forth in claim 24, further comprising shaft means supporting said drum in overhung position.

26. Apparatus as set forth in claim 24, wherein said engaging means comprises portions carried by and movable in planes extending radially of said drum.

27. Apparatus as set forth in claim 26, further comprising stationary cam means adjacent to said conveying means for operating said portions of said engaging means.

28. Apparatus as set forth in claim 27, further comprising means for biasing said portions of said engaging means against said cam means.

29. Apparatus as set forth in claim 19, wherein said comparing means comprises transducer means for producing an electrical impulse whenever the characteristics of an increment of said air stream deviate from said norm, and further comprising pneumatic ejector means for ejecting defective articles from said conveying means in response to such impulses.

30. Apparatus as set forth in claim 29, wherein said transducer means comprises an electropneumatic transducer whose input is in communication with the path for said air currents and whose output is connected with said ejector means.

31. Apparatus as set forth in claim 29, wherein said testing means further comprises means for indicating detection of defective articles.

32. Apparatus as set forth in claim 19, further comprising means for retaining satisfactory articles on said conveying means while such satisfactory articles advance beyond said predetermined zone.

33. Apparatus as set forth in claim 19, wherein said conveying means is disposed between a cigarette making machine and a take-off conveyor for satisfactory cigarettes.

34. Apparatus as set forth in claim 19, further comprising a stationary member adjacent to said conveying means at said predetermined zone of said path and means for engaging spaced portions of wrappers on articles travelling along said predetermined zone so that each wrapper held by such engaging means is confined around its circumference at two locations in the regions of its respective ends while the major part of the circumference of the thus held wrapper remains unconfined by said engaging means, a travelling portion of the path for said air currents extending through said conveying means and through successive engaging means and including a chamber adjacent to one end of each successive article which is tested during travel along said predetermined zone, a fixed portion of the path for said air currents extending through said stationary member.

35. Apparatus as set forth in claim 19, wherein the path for said currents of air extends through an article travelling along said predetermined zone while such article covers with said conveying means a distance at least approximating the distance between successively tested articles.

36. A method of testing the integrity and air resistance of hollow articles having two spaced openings and a restricted flow passage therebetween, comprising the steps of conveying the articles successively along a predetermined path with uniform spacing therebetween; passing air through each article while the latter travels along a zone of said path having a length which corresponds substantially to the distance between two adjacent articles; collecting the air streaming through the successive articles while being conveyed through said zone so that a continuous air stream is obtained; and sensing any change in said continuous air stream from a predetermined flow value as an indication of the defective character of the article then passing through said zone.

37. A method as set forth in claim 36, further comprising the steps of applying suction to successive articles to hold the latter during the conveying thereof along said path, discharging defective articles in a downward direction by applying air blasts thereagainst, and interrupting the application of suction to the articles when said air blasts are applied thereagainst for the discharge of faulty articles.

38. A method of testing the condition of cigarettes and similar articles, comprising conveying the articles successively along a predetermined path wherein the articles travel sideways with uniform spacing therebetween; testing the articles by passing therethrough currents of air while such articles travel along a predetermined zone of said path whereby the resistance offered by an article to the flow of air is indicative of the condition of the article; holding each tested article in the region of its ends while leaving the major part of the article unobstructed; collecting air currents used in testing of successive articles into an air stream wherein each such current corresponds to an increment of the air stream; and comparing the characteristics of successive increments with a predetermined norm which is indicative of a satisfactory article.

39. A method as set forth in claim 38, wherein during testing, the articles travel in an arcuate path and further comprising the steps of producing electrical signals whenever the characteristics of an increment of said air stream deviate from said norm, and utilizing such signals to eject the respective defective articles from said path, each of said articles being tested for a period of time at least approximating the interval required to convey an article along said predetermined path by a distance which equals the spacing between successively tested articles.

40. A method as set forth in claim 38, further comprising the step of mechanically holding the articles for movement along said path.

41. In an apparatus for testing the integrity of cigarettes or like rod-shaped articles, a device including a rotary drum having peripheral pockets and suction ports extending inwardly from said pockets, said drum having an external face and suction ducts between said ports and said face and being rotatable in a predetermined direction whereby said pockets travel successively past first, second and third areas adjacent to the periphery of said drum; means for feeding a succession of randomly distributed satisfactory and defective articles into the pockets travelling past said first area; suction generating means; means for connecting said suction generating means with suction ducts in communication with the suction ports extending inwardly from the pockets travelling between said first and third areas so that the articles received in such pockets are normally held therein by suction and are released only at said third area to be evacuated from the respective pockets; and signal-responsive means for disconnecting certain ones of said ports from said suction generating means not later than during travel of the respective pockets past said second area so that the corresponding articles can be evacuated ahead of said third area.

42. A device as defined in claim 41, wherein the means for connecting said suction source with said ports comprises solenoid-operated valve means.

43. A device as defined in claim 41, further comprising mechanical retaining means operative to retain the articles in their pockets during travel of the respective pockets between said first and second areas.

44. In an apparatus for testing the integrity of cigarettes, filter cigarettes and similar elongated rod-shaped articles having open-ended tubular wrappers, in combination, conveying means operative to advance the articles to be tested sideways along a predetermined path whereby the thus conveyed articles travel past a testing station, said conveying means comprising a hollow rotary drum which conveys the articles past said testing station and a stationary member extending into said drum; means for feeding the articles to said conveying means; means for engaging spaced portions of wrappers on articles travelling past said testing station so that each wrapper held by such engaging means is confined around its circumference at two locations in the regions of its respective ends while the major part of the circumference of the thus held wrapper remains unconfined by said engaging means, said engaging means comprising axially aligned groups of carrier means provided on said drum for supporting the articles and for maintaining the wrappers of such articles out of contact with the periphery of said drum; pneumatic means to convey currents of testing air along a preselected path extending through articles travelling along said predetermined path past said testing station, said preselected path having travelling and fixed portions respectively extending through said drum and said stationary member; and testing means including a device for determining the characteristics of air currents conveyed along said preselected path, said testing means being operative to initiate disposing of defective articles whenever the characteristics of an air current which is conveyed along said preselected path deviate from a predetermined norm which is indicative of a satisfactory article.

45. In an apparatus for testing the integrity of cigarettes or like rod-shaped articles, a device including a rotary drum having peripheral pockets and suction ports extending inwardly from said pockets, said drum further having an end face and axial suction ducts connected to said suction ports and terminating at said end face, said drum being rotatable in a predetermined direction whereby said pockets travel successively past first, second and third areas adjacent to the periphery of said drum; means for feeding a succession of randomly distributed satisfatory and defective articles into the pockets travelling past said first area; suction generating means; means for connecting said suction generating means with the suction ports extending inwardly from the pockets travelling between said first and third areas so that the articles received in such pockets are normally held therein by suction and are released only at said third area to be evacuated from the respective pockets, said connecting means comprising valve means adjacent to said end face and having arcuate slot means communicating with successive ducts in response to rotation of said drum; and signal-responsive means for disconnecting certain ones of said ports from said suction generating means not later than during travel of the respective pockets past said second area so that the corresponding articles can be evacuated ahead of said third area.

46. A device as defined in claim 45, wherein said valve means is movable axially with reference to said end face and further comprising resilient means for biasing said valve means against said end face.

47. A device for separating imperfect cigarettes from a procession of cigarettes and for use with a detector which produces a signal on the detection of an imperfect cigarette, comprising a rotatably mounted fluted drum having a flat face at one end thereof, means for feeding cigarettes to the flutes thereof, a delivery position at which satisfactory cigarettes are discharged from the drum, a second position at which imperfect cigarettes are discharged from the drum, means defining at least one hole in each flute by which a cigarette can be suctionally held thereto, means defining air passages in the interior of the drum, one end of each air passage communicating with the hole of one flute and the other end defining an opening on the flat face of the drum, said openings together defining a ring concentric with the axis of the drum, a stationary valve device having a flat face, the valve device and the drum being so disposed that their flat faces are in rubbing contact, a suction duct in the valve device, means defining communicating passages between the flat face of the valve device and the suction duct and means operable in response to a signal from said detector whereby suction can be regulated in each flute as the drum rotates so that imperfect cigarettes are discharged at the second position and acceptable cigarettes at the delivery position.

48. An apparatus for testing the integrity and flow resistance of elongated hollow articles intended to have only two spaced openings provided in the ends thereof and connected by a restricted flow path, comprising conveying means having carriers rotatable about a fixed axis and operative to transport the articles to be tested along a predetermined path from an article receiving station to an article discharging station and past a testing station and a defective article ejecting station arranged downstream of said testing station; fluid conducting means associated with each of said carriers and movable with said conveying means along said path and being respectively engageable with the two ends to communicate with the respective openings of an article transported by the related carrier during movement of the latter past said testing station; stationary means arranged to supply fluid under pressure to said fluid conducting means during movement of the related carriers past said testing station; stationary fluid conveying means extending from said testing station and there communicating with the fluid conducting means associated with a given carrier then passing said testing station so that a flow of fluid occurs through the article transported by said given carrier; a single testing device connected with said fluid conveying means to receive a flow of fluid under pressure through the articles passing consecutively the testing station and operative to provide a signal upon deviation of said flow from a predetermined value by reason of a defect in an article passing the testing station; and means actuated in response to a signal from said testing device to remove a defective article from the related carrier as the latter passes said ejecting station.

49. In an apparatus for testing the integrity of cigarettes or like rod-shaped articles, a device including a rotary drum having peripheral pockets, suction ports extending inwardly of said pockets, an end face and axial suction ducts connected to said suction ports and terminating at said end face, said drum being rotatable in a predetermined direction whereby said pockets travel successively past first, second and third areas adjacent to the periphery of said drum; means for feeding a succession of randomly distributed satisfactory and defective articles into the pockets travelling past said first area; suction generating means; means for connecting said suction generating means with suction ducts connected to suction ports extending inwardly from the pockets travelling between said first and third areas so that the articles received in such pockets are normally held therein by suction and are released only at said third area to be evacuated from the respective pockets; and signal-responsive means for disconnecting certain ones of said ports from said suction generating means not later than during travel of the respective pockets past said second area so that the corresponding articles can be evacuated ahead of said third area.

50. Apparatus for testing the condition of cigarettes and similar articles, comprising means for conveying the articles successively along a predetermined path wherein the articles travel sideways with uniform spacing therebetween; means for passing through the articles currents of air while such articles travel along a predetermined zone of said path whereby the resistance offered by an article to the flow of air is indicative of the condition of the articles; means for holding each article in the region of its ends while leaving the major part of the article unobstructed while the articles travel along said predetermined zone of said path; means for collecting air currents passing through successive articles into an air stream wherein each current corresponds to an increment of the air stream; and means for comparing the characteristics of successive increments of said air stream with a predetermined norm which is indicative of satisfactory articles.

51. In an apparatus for testing the integrity of cigarettes, filter cigarettes and similar elongated rod-shaped articles having open-ended tubular wrappers, in combination, conveying means operative to advance the articles to be tested sideways along a predetermined path whereby the thus conveyed articles travel past a testing station; means for feeding the articles to said conveying means; means for engaging spaced portions of wrappers on articles travelling past said testing station so that each wrapper held by such engaging means is confined around its circumference at two locations in the regions of its respective ends while the major part of the circumference of the thus held wrapper remains unconfined by said engaging means; pneumatic means to convey currents of testing air along a preselected path having travelling and fixed portions and extending through said conveying means and through articles travelling along said predetermined path past said testing station; means for collecting said currents of testing air after they have travelled through the articles to be tested into a combined air stream wherein each such current of testing air corresponds to an increment of the combined air stream; and testing means for comparing the characteristics of successive increments of said combined air stream with a predetermined norm which is indicative of satisfactory articles.

52. A method of testing the condition of cigarettes and similar articles, comprising conveying the articles successively along a predetermined path; testing the articles while travelling along a predetermined zone of said path by introducing air thereinto so as to create consecutive air currents each indicative of the condition of one of the articles tested; collecting said air currents into an air stream wherein each such current corresponds to an increment of the air stream; and comparing the characteristics of successive increments of the air stream with a predetermined norm so as to determine which of the tested articles is satisfactory.

References Cited

UNITED STATES PATENTS

| | | |
|---|---|---|
| 2,061,744 | 11/1936 | Temple. |
| 2,503,091 | 4/1950 | Brooke et al. |
| 2,951,364 | 9/1960 | Sherrill. |
| 3,001,648 | 9/1961 | Molins et al. |

DAVID SCHONBERG, *Primary Examiner.*

JEFFREY NOLTON, *Assistant Examiner.*